United States Patent
Fournier et al.

(10) Patent No.: US 9,053,331 B2
(45) Date of Patent: Jun. 9, 2015

(54) SECURISATION OF A REMOTE EXECUTABLE CODE USING A FOOTPRINT OF THE COMPUTER RECIPIENT

(75) Inventors: Jacques Fournier, Marseilles (FR); Franck Imoucha, Auriol (FR); Laurent Gauterron, Marignane (FR); Véronique Charpeignet, Toulon (FR)

(73) Assignee: Gemalto SA, Meudon (FR)

( * ) Notice: Subject to any disclaimer, the term of this patent is extended or adjusted under 35 U.S.C. 154(b) by 371 days.

(21) Appl. No.: 13/382,462

(22) PCT Filed: Jun. 18, 2010

(86) PCT No.: PCT/EP2010/058668
§ 371 (c)(1),
(2), (4) Date: Jan. 5, 2012

(87) PCT Pub. No.: WO2011/003721
PCT Pub. Date: Jan. 13, 2011

(65) Prior Publication Data
US 2012/0110265 A1 May 3, 2012

(30) Foreign Application Priority Data

Jul. 6, 2009 (EP) .................................... 09305649

(51) Int. Cl.
*G06F 15/16* (2006.01)
*G06F 21/60* (2013.01)

(52) U.S. Cl.
CPC .................................... *G06F 21/606* (2013.01)

(58) Field of Classification Search
CPC ........ G06F 21/606; G06F 21/57; G06F 21/64
USPC ........................................... 726/17, 30, 34, 1
See application file for complete search history.

(56) References Cited

U.S. PATENT DOCUMENTS

| 2001/0042124 | A1 | 11/2001 | Barron |
| 2005/0021953 | A1* | 1/2005 | Trommler ...................... 713/166 |
| 2007/0083610 | A1* | 4/2007 | Treder et al. .................. 709/217 |
| 2007/0113090 | A1* | 5/2007 | Villela .......................... 713/170 |
| 2008/0132279 | A1* | 6/2008 | Blumenthal .................. 455/558 |
| 2008/0155529 | A1* | 6/2008 | Kang et al. .................... 717/174 |
| 2009/0254753 | A1* | 10/2009 | De Atley et al. .............. 713/176 |

(Continued)

FOREIGN PATENT DOCUMENTS

| GB | 2 434 887 A | 8/2007 |
| WO | WO 01/73530 A2 | 10/2001 |

OTHER PUBLICATIONS

Jansen et al, Guidelines on Cell Phone and PDA Security, NIST, Oct. 2005, pp. 1-51.*

(Continued)

*Primary Examiner* — Luu Pham
*Assistant Examiner* — Jenise Jackson
(74) *Attorney, Agent, or Firm* — Buchanan Ingersoll & Rooney PC

(57) ABSTRACT

Method of securing exchanges between two electronic devices, by using an imprint of at least one of the two devices. This imprint is obtained on the basis of all or part of the electronic components of which this device is composed. This imprint will serve, either to protect the confidentiality of the data exchanged, or to attest to the identity of the device issuing the data.

15 Claims, 1 Drawing Sheet

(56) References Cited

U.S. PATENT DOCUMENTS

2012/0060030 A1* 3/2012 Lamb ........................... 713/166
2012/0131294 A1* 5/2012 Chen et al. ................... 711/162

OTHER PUBLICATIONS

Huebner et al, Computer Forensics—Past, Present and Future, IEEE, 2007, pp. 1-15.*

International Search Report (PCT/ISA/210) issued on Sep. 3, 2010, by European Patent Office as the International Searching Authority for Internationai Application No. PCT/EP2010/058668.

Dacfey Dzung, Martin Naedele, Thomas Von Hoff and Mario Crevatin., "Security for Industrial Communication Systems", Proceedings of the IEEE, New York, U.S., vol. 93, No. 6, Jun. 1, 2005, pp. 1152-1177, XP-011133109.

* cited by examiner

SECURISATION OF A REMOTE EXECUTABLE CODE USING A FOOTPRINT OF THE COMPUTER RECIPIENT

The invention relates to the localization securing of a remote code through the recipient's imprint.

The invention more particularly relates to the securing of exchanges between two devices, during the execution of a distributed code.

Mobile electronic devices are going through a radical change-over. As a matter of fact, their storage capacity is progressing, their computing power per dimension unit increases as their overall dimensions reduce.

A new generation of such devices has made it possible to develop a new distributed model. Such devices, which are currently named Smart Keys, have the characteristic of being equipped with a memory, an electronic intelligence and an access to a secure electronic module. An executable computer code (one or several software), which is intended to be loaded (through the communication interface of the Smart Key, often a USB key) onto another host electronic device, also called the execution device, is saved in the memory of these Smart Keys.

Such particular code is currently called CDROM since, in most cases, the code is stored as an 'ISO' image, on a "Read Only" partition which emulates a CD-ROM which will be seen as such (i.e. like a "compact disk") by the host electronic device (the computer).

Generally speaking, when the Smart Key is inserted into a computer, the latter detects it, recognizes it and activates it. The activation phase consists, among other things, in mounting onto the operation system the various "disks" supplied by the Smart Key, among which the one containing the CD-ROM. Once activated, the Smart Key then sends the content of the CDROM to the computer executing said content.

Such a technology makes it possible to transport a possibly large executable code onto a not fixed support, through a USB communication interface, widely spread in computers. As a matter of fact, the compact disk and the subsequent generations make it possible to transport such a computer code, but statically.

The Smart Keys offer the possibility of making this computer code evolve, but also a whole set of functionalities related to the embedded intelligence and to the secure electronic module. Such functionalities can for example be related to security.

In addition, such devices make it possible to execute computer applications on a device (called execution device) without relying on the software resources of such an execution device. As a matter of fact, the computer code supplied by the Smart Key only uses the electronic resources of the execution device.

This makes it possible to use software on a device without needing to rely on this device, and without leaving any trace since the executed computer code is not permanently or persistently stored on an execution device.

One major risk entailed in this system is that the execution device may include a malicious programme of the computer virus or Trojan horse types.

In the strict sense of the word, a computer virus is a computer programme written for propagating to other computers by sneaking into legitimate programs, called "host" programs. It may also have the (desired or not) damaging effect of more or less seriously disturbing the operation of the infected computer.

Trojan horses are programs executing harmful operations while appearing as useful applications or files to the user.

Whatever the malicious program, or "malware", many are those whose main function is to be a bridgehead. This refers to a program which captures all or part of the events which occurred in the infected computer, and transmits these (generally through the Internet) to a so-called attacking computer, and vice versa. This action makes it possible, among other things, to spy the infected computer, and to misappropriate some of its applications.

As a matter of fact, within the utilisation of a program originating from a smart key on an infected computer, and wherein the attacking computer has a copy of this program (because it legally owns a similar smart key, or because it found the content of the mass memory by some means), the malware will enable the attacking computer, for instance, to use the services of the smart key, without the legitimate owner knowing it.

Basically, we have defined such a malware as being able to spy the events which occurred in an infected computer and to transmit these to the attacking computer, and vice versa.

It can thus spy the exchanges between the application which is executed on the infected computer and the smart key connected thereto. It can thus supply to the application executed in the attacking computer the same information as the one received by the application executed on the infected computer. This technique is called the synchronisation of applications. In return, the attacking computer can also take actions on its application, and when the latter needs services from the smart key, it can send the requests to the malware existing in the infected computer which transmits these to the smart key by pretending the action originates from the application existing in the infected computer.

Thanks to this trick, an attacker will use a service or a function supplied by his/her victim's smart key, without the victim knowing it.

The present invention proposes to prevent such attacks.

For this purpose, the invention more particularly discloses a securing method, including at least a first electronic device, also called a "Smart Key", able to communicate with at least a second electronic device, also called a "computer", the "Smart Key" electronic device including at least one controller, one mass memory wherein a first executable computer program is saved, and also including access to a second executable computer code, also called the "Secure Agent", with the first executable computer code being intended to be executed by the "computer" device. This method includes at least the following steps:

recognition, wherein the controller transmits the first executable Secure Agent code (25) to the "computer" device and commands the execution thereof by said device, collection, wherein said Secure Agent code collects information relating to all or part of the electronic components of which the "computer" device is composed, creation (or generation, both terms are correct) of an imprint of the "computer" device from the collected information, securing all or part of the data exchanged between the "computer" and "Smart Key" devices, using the imprint.

In one embodiment, the information related to all or part of the electronic components of which the "computer" device is composed may be unmodifiable information.

Such information may, for instance, be series numbers or technical characteristics.

Depending on the embodiments, the imprint may be generated by said Secure Agent code, in another embodiment, the collected information may be transmitted to the "Smart Key"

device which generates the imprint, or the collected information may be transmitted to a secured electronic device SE which generates the imprint.

The creation of the imprint may further include the utilisation of a not constant datum, which may be a random number.

Depending on the embodiments, the method according to the invention may be implemented before the execution of the first executable code, or for instance during the execution of the first executable code that it triggered.

Other characteristics and advantages of the invention will clearly emerge from the following description which is given as an indication and not as a limitation, and referring to the appended drawings, wherein.

Figure 1:
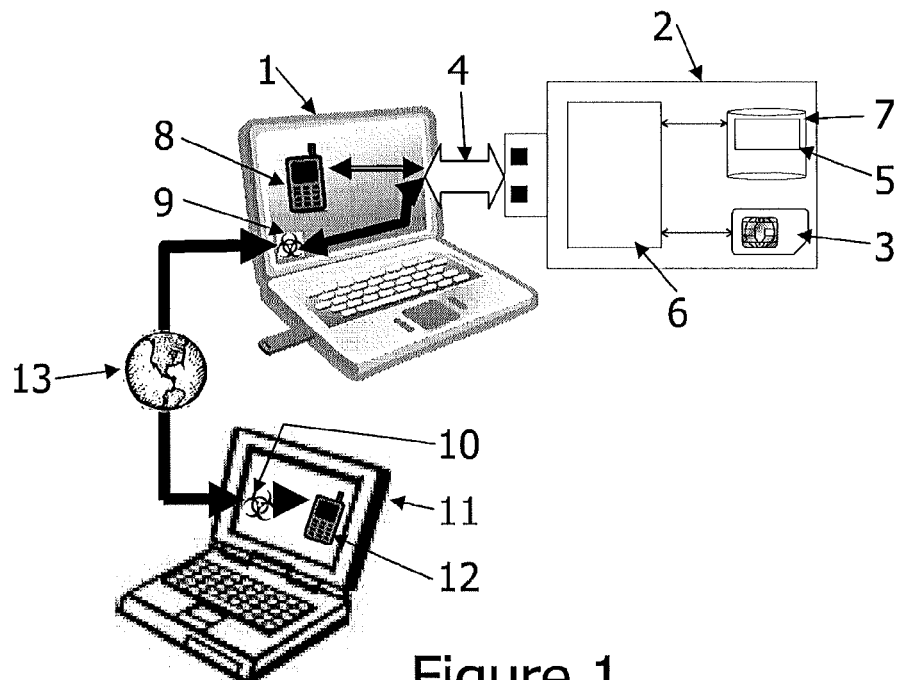
FIG. 1 shows the malicious operation of malware, according to the prior art.

In FIG. 1, we can identify a smart key 2, which is connected to an electronic device 1. This device is shown by a computer. In a normal operation of the system, the computer 1 and the key 2 communicate through a communication channel shown by the double arrow 4. This channel can be provided by any computer communication protocol.

Such protocols can be wire ones, such as T-carrier (T1, T3, etc.), RS232, Ethernet, IDE, . . . or wireless ones such as infrared, wifi, Bluetooth, RFID, . . . .

In a preferred embodiment of the invention, the key and the computer communicate through the USB ("Universal Serial Bus") protocol. Using this protocol makes it possible to easily connect the key 2 to a personal computer such as the computer 1 in FIG. 1, and that it recognized (through low-level software, also currently called "drivers", which are present in most operation systems).

The most advanced keys contain a security module 3 such as a chip card.

In order to easily manage the exchanges between the key 2, the computer 1 and, possibly, the secure module 3, a controller 6 is frequently inserted into the smart keys. The controller, shown by the box 6 in FIG. 1, supposes that at least one computing component (microprocessor), a working memory (volatile memory) and a non volatile memory (for instance RAM or ROM) are present in the smart key 2.

In addition, the key includes a non volatile memory 7, also called a mass memory, which contains an executable computer code 5, that we will call the "application" in the rest of this document.

Upon connection of the key 2 with the computer 1, the key receives the power it requires for starting up. The controller 6 then communicates with the computer 1.

During this phase, the controller starts a communication session, which supposes, among other things, the identification of the key by the type of electronic device thereof (mass storage unit, multimedia device . . . ).

A communication also starts, during which the key informs the computer 1 that it contains an application 5, and that this application must be executed by the electronic resources of the computer 1. Such communication can advantageously be generated by identifying the application as a CDROM with the computer. As a matter of fact, upon inserting a CDROM into a computer, the latter is identified as such, and the standard answer from the computer (or more precisely the computer operation system) consists in executing the content, if the latter allows it ("autorun").

Once the application is registered with the computer 1, the controller 6 of the key 2 sends the application 5 to the computer 1, which executes it 8.

This computer system makes it possible, among other things, to execute the application 5 on a computer 1, which does not have it. In addition, using the security module 3 makes it possible to restrict the utilisation of the application 5 with the most advanced cryptographic tools. For instance an authentication assigned to the security module (for instance through the utilisation of a personal code ("PIN" code) can be associated with any invasive command.

In FIG. 1, this application 8 is represented by a telephone since the operation of the invention will be illustrated with the example of a softphone.

Softphone is a type of software used for using telephony through the Internet from a computer rather than from a telephone. In order to provide the optimum security level, some softphones are operated with an external dongle, generally a USE one.

In the example shown in FIG. 1, the code 5 of the softphone is contained in a non volatile memory 7 of the key 2, and delivered to the computer 1 through a CDROM. The security module 3 further contains all the elements required for the authentication of the user on the telephony network. Such information is confidential and critical, since using it entails a billing of the user, and the user's responsibility. As a matter of fact, fraudulent actions executed through a private communication result in the owner's responsibility.

In FIG. 1, the icon 9 illustrates a virus which is present in the computer 1. The virus is in contact with its counterpart 10 in the computer 11 of a hacker. The virus can communicate by any means, more particularly infrared, Bluetooth, . . . , with the most frequent means being the operation of an Internet connection 13, if any.

In order to achieve his/her attack, the hacker's computer 11 has a version 12 of the softphone application. It may have this version of the application because he/she also owns a smart key of the same type as the key 2, but the rights of which have elapsed, for example, or through the illegal acquisition of the application, through an illegal loading, for instance.

In order to operate, in our example, in order to make a call, the application 12 must have access to a key containing valid authentication elements, which the hacker does not have.

The virus 10 will then contact the virus 9 in order to use the elements contained in the secure module 3 of the key 2.

As a matter of fact, the virus 10 can pretend it is a key, with the softphone 12. It will then receive the communications intended for a hypothetical key. Such information will be transmitted to the virus 9, which will in turn, send it to the key 2, instead of the softphone 8. The information returned by the key 2 follow the reverse path to be communicated to the softphone 12.

Figure 2:
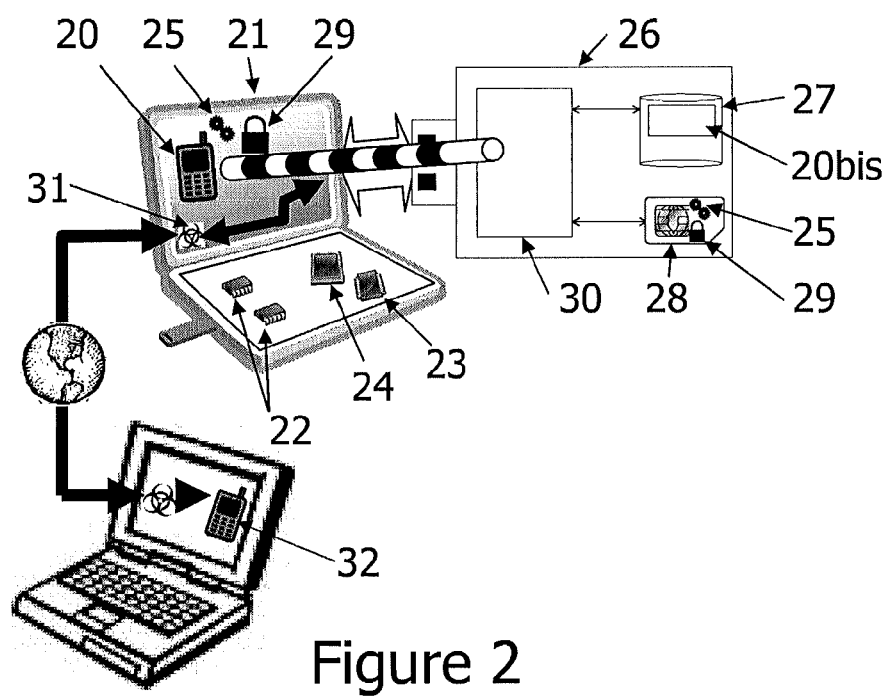
FIG. 2 shows the implementation of the invention.

FIG. 2 integrates the present invention into this diagram.

As a matter of fact, prior to launching the softphone application 20, the method according to the invention computes an imprint of the computer 21. Such an imprint is based on the computer electronics.

As a matter of fact, an electronic device, such as a computer, is composed of a set of electronic components 22, 23, 24. Such components are, by definition, unique. Basically, 2 processors of the same model and the same series can be distinguished by their series number for instance, two storages can be distinguished by their series numbers or by the arrangement of their addressable space. The invention consists in collecting this type of information, on some components, in order to obtain a unique imprint of our device 21.

Using series numbers is a particularly efficient method of implementation, but the performance computation also gives very good results.

Performance calculation is based on the fact that the same (relatively complex) operation to be executed by two components is carried out in slightly different times. Such times are also signatures of such components.

The invention thus proposes an executable computer code 25, also called Secure Agent, which is in charge of collecting such information. Secure Agent is provided through the key 26 and executed by the computer 21, the components 22, 23, 24 of which it will analyze. The secure agent can be stored either in a non volatile memory 27 of the key 26, or in the security module 28. Such secure agent can also be in charge of computing the imprint 29, from the collected data. According to the embodiments, the secure agent can be transmitted and executed as from the setting of the smart key, or subsequently, but in any case, prior to using applications requiring the security level brought by the invention.

According to the implementation method, all the components 22, 23, 24 having characteristic values, can be used. But in a preferred embodiment, some components only are used for defining the imprint 29. Such particular components can be selected according to their nature, or randomly, or a combination of both techniques.

For example, a solution consists in that, during the step of imprint 29 definition, the secure agent 25 collects a list of all or part of the components 22, 23, 24, able to give a characteristic value. Such list is transmitted to the key 26, which will select a sub-set from this list and thus define the components, the values of which will create the imprint 29.

A particularly efficient method consists of a regular exchange of such sub-set in order to be protected against communication spying and "replay".

"Replay Attacks" are "Man in the middle" type attacks consisting in intercepting packets of data and replaying these, i.e. re-transmittiing these as such (without any decryption) to the receiving computer.

Depending on the embodiments of the invention, the imprint 29 can be computed in the computer 21 by one part of the application 20, in the key 26 or in the secure module 28.

Using the secure module for generating the imprint makes it possible to use, during the generation, all or part of the cryptographic means embedded in the secure module 28.

The imprint is generated from the values of the selected components by applying at least one function.

This function must be reproducible, i.e. the function matches one and only one result with a set of input parameters.

It may also be of interest to choose a non reversal function, i.e. it is impossible to find the input parameters from the result.

Particularly efficient examples of such functions are, for instance, the "exclusive OR" function, or the hashing functions.

A hashing function is a function which can associate with one element an imprint (also called the hashed version), while preserving 23 essential characteristics:
  Starting from the hashed version, it must be impossible to find the information used for the generation thereof.
  When talking about electronic data processing, it is impossible to find two pieces of data, whatever these are, which give the same hashed version when applied to the same hashing function.
  When talking about electronic data processing, it is impossible to find another datum having the same hashed version, starting from a datum and the hashed version thereof, and from a hashing function.

The SHA-1 (Secure Hash Algorithm 1: 160 bits) and SHA-2 (SHA-256, SHA-384 or SHA-512 bits, whatever you chose) are frequently used hashing functions.

In a preferred embodiment of the invention, generating the imprint further includes the utilisation of another value. Such value is a not fixed value, and thus may be a random number, for instance.

Once the imprint 29 is obtained, it must be shared by the softphone application 20 and the key 26 in order to secure all or part of the exchanges. The secure module 28 generally keeps and uses the imprint 29 for the key 26.

In a particularly interesting embodiment of the invention and in order to prevent any interception of the communication of such an imprint 29, the Secure Agent 25 is loaded and executed by the computer 21. The Secure Agent collects information on all or part of the components 22, 23, 24 of the computer 21, and transmits these to the key 26.

The key 26 selects a sub-assembly of such information, using the secured module 28, and generates an imprint 29, as explained here-above. The imprint is integrated in the program 20b is before the latter is loaded and executed by the computer 21. The program then knows the imprint 29, without the latter having been directly exchanged between the computer 21 and the key 26.

Securing the exchanges can take several different forms. As a matter of fact, it can be applied one way or two ways.

When securing is one-way, it will be effective only for information for instance originating from the softphone application 20 destined to the key 26, or reversely.

The softphone will then use the imprint 29 on its messages, and the key 26 will check that the correct imprint has been used.

Then, securing can protect the exchanges, as regards confidentiality, or not.

If the choice has been made to protect confidentiality, securing the exchanges will then be by the enciphering thereof with a key totally or partially composed of the imprint, and a secret key algorithm. If the choice has been made not to secure the exchanges, as regards confidentiality, securing will then be by the marking of the exchanged data so that the origin thereof is guaranteed. Applying the imprint at the beginning or at the end of the datum may also be a solution in this embodiment. The datum to be secured can also be associated with a hashed version thereof, while taking into account the imprint 29.

If a datum received by one of the devices in the system is not as secure as expected, such datum shall be ignored in a preferred embodiment of the invention. In another embodiment, such datum can be processed, but some piece of information can be saved for a subsequent analysis.

Then, the virus 31 installed in the computer 21 can no longer transmit the application 32 information to the key 26, since it does not have the imprint 29 required for securing such data.

The invention claimed is:

1. A method for securing at least a first electronic device configured to communicate with at least a second electronic device, said first electronic device including at least one controller, a mass memory wherein a first executable computer code is saved, said first executable computer code using electronic resources of the second electronic device to execute the first executable computer code on the second electronic device, and a second, executable Secure Agent code, wherein said first executable computer code is intended to be executed by said second electronic device, the method comprising the following steps:
  transmitting, by said controller, said second, executable Secure Agent code to the second electronic device and commanding execution thereof by said second electronic device, executing said second, executable Secure Agent code by using the electronic resources of the second electronic device, collecting, by said second, executable Secure Agent code, information relating to all or part of the electronic components of the second electronic device, creating an imprint of said second electronic device from said collected information, wherein creating the imprint of said second electronic device includes a performance computation using all or part of the electronic components of the second electronic device, and securing, during execution of said first executable computer code on the second electronic device by using the electronic resources of the second electronic device, all or part of the data exchanged between said first and second electronic devices using said imprint.

2. The method according to claim 1, wherein said information related to all or part of the electronic components of the second electronic device is unmodifiable information.

3. The A method according to claim 2, wherein said information is series numbers.

4. The method according to claim 2, wherein said collected information is technical information.

5. The method according to claim 1, wherein said imprint is generated by said Secure Agent code.

6. The method according to claim 1, wherein said information is transmitted to the first electronic device, which generates said imprint.

7. The method according to claim 1, wherein said information is transmitted to a secured electronic device different from said first and second electronic devices, which creates said imprint.

8. The method according to claim 5, wherein said creation of the imprint further includes the utilisation of a non-constant datum.

9. The method according to claim 8, wherein said non-constant datum is a random number.

10. The method according to claim 1, wherein said method is implemented before the execution of said first executable code.

11. The method according to claim 1, wherein said method is implemented during the execution of said first executable code.

12. The method according to claim 11, wherein said method is triggered by said first executable code prior to executing code of said first, executable code that requires security.

13. The method according to claim 1, wherein the collecting, by said second, executable Secure Agent code, includes collecting a list of all or part of the electronic components configured to provide a characteristic value, and wherein the creating of the imprint is based on a sub-set of the collected list of the electronic components.

14. The method according to claim 13, furthering comprising:

regularly exchanging the imprint with a new imprint, wherein the new imprint is created based on a different sub-set of the collected list of the electronic components.

15. The method according to claim 6, said method further comprising:

integrating the imprint in the first executable code, subsequent to integrating the imprint in the first executable code, transmitting the first executable code from the first electronic device to the second electronic device, and executing the first executable code using electronic resources of the second electronic device.

* * * * *